(12) United States Patent
Wang et al.

(10) Patent No.: US 10,459,275 B2
(45) Date of Patent: Oct. 29, 2019

(54) POLARIZER, MANUFACTURING METHOD THEREOF, DISPLAY PANEL AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Junwei Wang, Beijing (CN); Haifeng Yu, Beijing (CN); Haiqin Huang, Beijing (CN); Dongxi Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/518,449

(22) PCT Filed: Feb. 24, 2016

(86) PCT No.: PCT/CN2016/074445
§ 371 (c)(1),
(2) Date: Apr. 11, 2017

(87) PCT Pub. No.: WO2016/145975
PCT Pub. Date: Sep. 22, 2016

(65) Prior Publication Data
US 2017/0307918 A1  Oct. 26, 2017

(30) Foreign Application Priority Data
Mar. 13, 2015 (CN) .......................... 2015 1 0112599

(51) Int. Cl.
*G02F 1/1335* (2006.01)
*G02B 5/30* (2006.01)
(Continued)

(52) U.S. Cl.
CPC ............. *G02F 1/1335* (2013.01); *G02B 1/14* (2015.01); *G02B 5/30* (2013.01); *G02B 5/3033* (2013.01);
(Continued)

(58) Field of Classification Search
CPC .......... G02B 5/305–3025; G02B 27/28; G02B 6/4275; G02B 5/3058; G02F 1/133528;
(Continued)

(56) References Cited

U.S. PATENT DOCUMENTS

2003/0223249 A1* 12/2003 Lee ................... G02F 1/133604
362/561
2005/0117217 A1* 6/2005 Yamaoka ............. G02B 5/3033
359/485.03
(Continued)

FOREIGN PATENT DOCUMENTS

CN 101137917 A 3/2008
CN 202177763 U 3/2012
(Continued)

OTHER PUBLICATIONS

International Search Report and Written Opinion in PCT/CN2016/074445 dated May 30, 2016, with English translation. 16 pages.
(Continued)

*Primary Examiner* — Paisley L Arendt
*Assistant Examiner* — Mariam Qureshi
(74) *Attorney, Agent, or Firm* — Womble Bond Dickinson (US) LLP

(57) ABSTRACT

The embodiments of the present invention provide a polarizer, a manufacturing method thereof, a display panel and a display device, to avoid mura caused by the film peeling process of the polarizer, thereby reducing the probability of bad quality products, simplifying the assembly process, and preventing the omission of conductive attachment. The
(Continued)

polarizer includes a main body layer, a protective film layer, a conductive layer and a release film. A first surface of the main body layer is attached with the protective film layer. A second surface of the main body layer is attached with the release film. A periphery of the main body layer is attached with the conductive layer.

19 Claims, 4 Drawing Sheets

(51) Int. Cl.
  *G02F 1/1333* (2006.01)
  *G02F 1/1337* (2006.01)
  *G02F 1/135* (2006.01)
  *G02F 1/136* (2006.01)
  *G02F 1/1362* (2006.01)
  *G02B 1/14* (2015.01)

(52) U.S. Cl.
  CPC .............. *G02F 1/135* (2013.01); *G02F 1/136* (2013.01); *G02F 1/1337* (2013.01); *G02F 1/133345* (2013.01); *G02F 1/133528* (2013.01); *G02F 1/136204* (2013.01); *G02F 2001/133388* (2013.01); *G02F 2201/50* (2013.01); *G02F 2202/22* (2013.01); *G02F 2202/28* (2013.01)

(58) Field of Classification Search
  CPC ........... G02F 1/136204; G02F 2202/22; G02F 2207/121; G02F 2001/133548
  See application file for complete search history.

(56) References Cited

U.S. PATENT DOCUMENTS

| | | | | |
|---|---|---|---|---|
| 2007/0171335 A1* | 7/2007 | Son | ...................... | G02B 5/3016 349/96 |
| 2007/0183025 A1* | 8/2007 | Asakawa | ............... | B82Y 20/00 359/359 |
| 2008/0192345 A1 | 8/2008 | Mochizuki et al. | | |
| 2010/0182524 A1* | 7/2010 | Nomura | ............ | G02F 1/133308 349/40 |
| 2014/0022638 A1* | 1/2014 | Wu | ........................... | G02B 5/30 359/483.01 |
| 2014/0211134 A1* | 7/2014 | Yang | .................. | G02F 1/133382 349/106 |
| 2015/0309215 A1* | 10/2015 | Gai | ........................... | G02B 1/16 359/513 |
| 2016/0054607 A1* | 2/2016 | Ishizaki | ............... | G02F 1/13338 349/12 |
| 2016/0159052 A1* | 6/2016 | Kim | ........................ | B32B 27/08 361/679.01 |
| 2016/0349573 A1* | 12/2016 | Ohmuro | ................. | G02F 1/1336 |

FOREIGN PATENT DOCUMENTS

| | | | |
|---|---|---|---|
| CN | 103080792 | A | 5/2013 |
| CN | 103399438 | A | 11/2013 |
| CN | 103614090 | A | 3/2014 |
| CN | 103913881 | A | 7/2014 |
| CN | 104049294 | A | 9/2014 |
| CN | 104635292 | A | 5/2015 |
| JP | 2001329078 | A | 11/2001 |
| JP | 2004287199 | A | 10/2004 |
| JP | 2005181818 | A | 7/2005 |
| JP | 2010096948 | A | 4/2010 |
| JP | 2010170131 | A | 8/2010 |
| TW | I 284749 | B | 8/2007 |

OTHER PUBLICATIONS

Office Action in Chinese Application No. 201510112599.2 dated Jun. 12, 2016, with English translation. 16 pages.
Office Action in Chinese Application No. 201510112599.2 dated Oct. 26, 2016, with English translation. 13 pages.
Office Action in Chinese Application No. 201510112599.2 dated Mar. 8, 2017, with English translation. 7 pages.

* cited by examiner

POLARIZER, MANUFACTURING METHOD THEREOF, DISPLAY PANEL AND DISPLAY DEVICE

RELATED APPLICATIONS

The present application is the U.S. national phase entry of the international application PCT/CN2016/074445, with an international filing date of Feb. 24, 2016, which claims the benefit of Chinese Patent Application No. 201510112599.2, filed on Mar. 13, 2015, the entire disclosures of which are incorporated herein by reference.

TECHNICAL FIELD

The present invention relates to the field of liquid crystal display technology, in particular to a polarizer, a manufacturing method thereof, a display panel and a display device.

BACKGROUND

ADS (Advanced Super Dimension Switch) technology is a wide viewing angle technology developed to provide a large size, high definition desktop display and LCD TV application, which is a kind of hard screen technology. The ADS technology overcomes the problem of low transmittance of conventional IPS (In-Plane-Switching) technology, and realizes high transmission with a wide viewing angle.

A large quantity of static electricity is typically generated during the film peeling process of the ADS display panel product. In some abnormal conditions, the generated electrostatic cannot be dissipated quickly, causing polarization of the liquid crystal, and leading to unrecoverable mura (i.e., uneven brightness of the display, with various traces).

The existing manufacture procedure for ADS products has no specific treatment on this process. Typically, the modules are assembled instantly after the film is peeled off, and conductive tapes (usually with a width of about 1 cm and a length of about 1 cm, on left and right sides) are applied to connect the CF (color filter), ITO (indium tin oxide) and the outer frame. Therefore, there may be random defects to some extent, increasing the probability of bad quality products.

SUMMARY

The embodiments of the invention provide a polarizer, a manufacturing method thereof, a display panel and a display device, to avoid mura caused by the film peeling process of the polarizer, thereby reducing the probability of bad quality products, simplifying the assembly process, and preventing the omission of conductive attachment.

An embodiment of the present invention provides a polarizer. The polarizer includes a main body layer, a protective film layer, a conductive layer and a release film. A first surface of the main body layer is attached with the protective film layer. A second surface of the main body layer is attached with the release film. A periphery of the main body layer is attached with the conductive layer.

Optionally, the first surface of the main body layer is evaporated with a metal film. A polarization direction generated by a grid of the metal film is consistent with a polarization direction of the main body layer.

Optionally, the metal film is an aluminum film or a copper film.

Optionally, the protective film layer is attached to the first surface of the main body layer through a pressure-sensitive adhesive layer.

Optionally, a conductive diffusion parameter of the pressure-sensitive adhesive layer is greater than a preset threshold.

Optionally, the pressure-sensitive adhesive layer is composed of a conductive polymer material, an electric network, a carbon black doped material or a conductive particle doped material.

Optionally, a size of the protective film layer is larger than a size of the main body layer.

Optionally, a conductive adhesive layer is applied for bonding the protective film layer and the conductive layer.

Optionally, a conductive adhesive layer is applied for bonding the release film and the conductive layer.

Optionally, the conductive layer is a carbon black adhesive layer or an aluminum film.

An embodiment of the present invention also provides a method for manufacturing a polarizer. The method includes: attaching two release films to two surfaces of a main body layer with a preset size; after removing a release film from one surface of the main body layer, attaching a protective film layer to the surface of the main body layer without release film; attaching a conductive layer to a periphery of the main body layer, and attaching a release film to a surface of the conductive layer departing from the remaining release film.

Optionally, the release film attached on the other surface of the main body layer covers the main body layer and extends to the periphery of the main body layer.

An embodiment of the present invention also provides a display panel including a liquid crystal panel and two above mentioned polarizers, from which the release films are removed. A first polarizer is attached to a first surface of the liquid crystal panel through a second surface of the first polarizer, and a second polarizer is attached to a second surface of the liquid crystal panel through a second surface of the second polarizer.

An embodiment of the present invention also provides a display device including the above mentioned display panel.

In the polarizer, manufacturing method thereof, display panel and display device provided by the embodiments of the invention, a conductive layer is attached to the periphery of the polarizer. In this way, during the film peeling process, the generated static electricity can be diffused through the conductive layer to the grounded periphery, the charge will be dissipated and conducted to the ground. The polarizer provided by the embodiment of the invention facilitates the production process. The conductivity of the polarizer is enhanced. With the structure design, the charge conduction performance is improved and the electrostatic discharge paths are increased. The electrostatic mura is reduced, thereby reducing the probability of bad quality products, simplifying the assembly process, and preventing the omission of conductive attachment.

Other features and advantages of the present invention will be described in the subsequent specification and, in part, become apparent from the specification or understood by the implementation of the present invention. The purpose and other advantages of the present invention can be achieved and acquired by means of the structure described in the specifications, claims, and drawings.

BRIEF DESCRIPTION OF THE DRAWINGS

The implementation of the present invention will be described below in more detail in combination with the drawings and the embodiments. The following embodiments are used for explanation of the present invention, not for limitation of the scope of the present invention. In the drawings.

DETAILED DESCRIPTION OF THE INVENTION

In the prior art, a large quantity of static electricity is typically generated during the film peeling process of display panel products, which causes mura and raises the probability of bad products. In the embodiments of the present invention, the structure of the polarizer is preprocessed, then the static electricity generated during the film peeling process can be effectively discharged. The electrostatic mura is prevented, thereby reducing the probability of bad quality products, simplifying the assembly process, and preventing the omission of conductive attachment.

In the following, the technical solutions in embodiments of the invention will be described clearly and completely in connection with the drawings in the embodiments of the invention. It should be understood that the embodiments described herein are only used for describing and explaining of the invention, rather than limiting the invention. In the absence of conflict, the embodiments of the present invention and the features in the embodiments can be combined with each other.

Embodiment 1

Figure 1A:
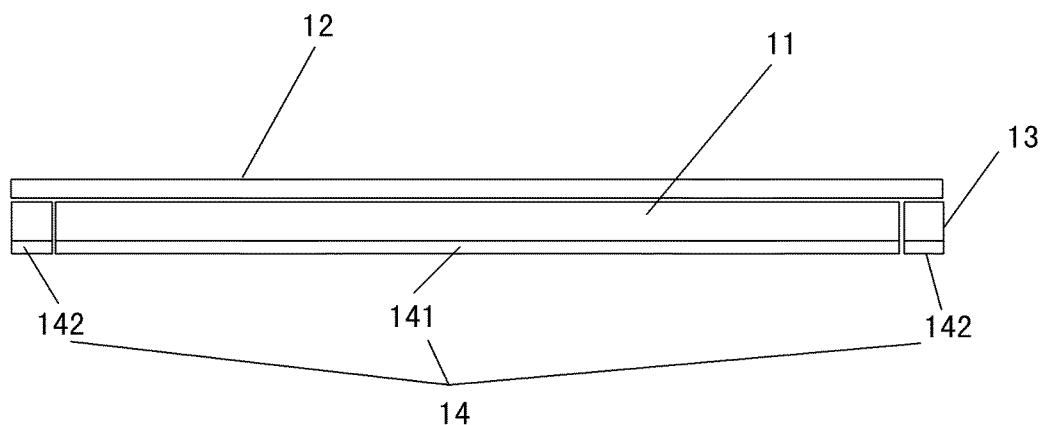
FIG. 1a is a schematic diagram for a basic structure of a polarizer according to an embodiment of the invention.

An embodiment of the present invention provides a polarizer. The polarizer includes a main body layer 11, a protective film layer 12, a conductive layer 13 and a release film 14. A first surface of the main body layer 11 is attached with the protective film layer 12. A second surface of the main body layer 11 is attached with the release film 14. A periphery of the main body layer 11 is attached with the conductive layer 13. FIG. 1a is a schematic diagram for a basic structure of a polarizer according to the embodiment of the invention. In FIG. 1a, from bottom to top, the release film 14, the main body layer 11 and the conductive layer 13 located on the periphery of the main body layer 11, and the protective film layer 12 are successively arranged. The release film 14 can include two portions: the release film 141 in contact with the main body layer 11, and the release film 142 in contact with the conductive layer 13. Optionally, a conductive adhesive layer can be applied for bonding the release film 142 and the conductive layer 13.

In general, the first surface can be a surface of the main body layer for forming polarized light, the second surface is a surface of the main body layer opposite to the first surface. The other surfaces of the main body layer (e.g., the lateral surfaces shown in FIG. 1a) constitute the periphery of the main body layer.

Figure 1B:
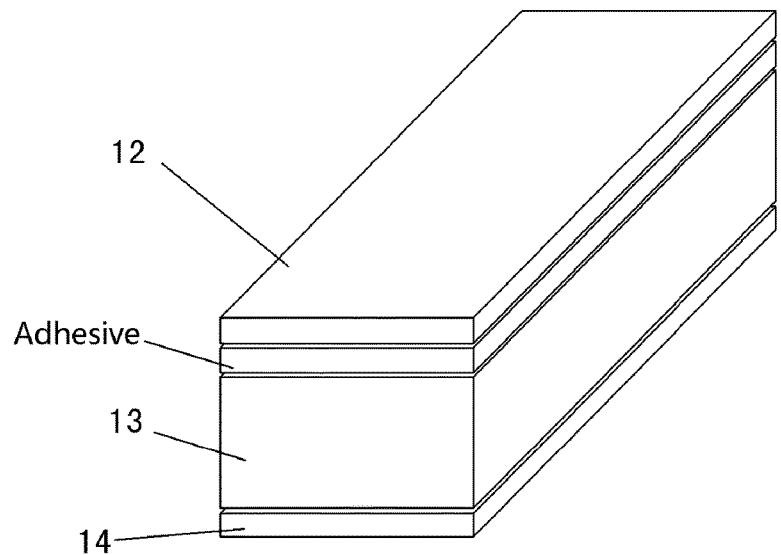
FIG. 1b is a cross-section schematic diagram for a periphery of a polarizer according to an embodiment of the invention.

It should be noted that before the conductive layer 13 is attached to the main body layer 11, the conductive layer 13 can also have a structure with two protective films on both surfaces of the conductive layer 13, and one of these protective films can be retained after the conductive layer 13 is attached to the main body layer 11. In an implementation, the size of the protective film layer 12 can be slightly larger than the size of the main body layer 11, and the portion beyond the main body layer 11 can cover the conductive layer 13 with the same thickness as the main body layer 11. FIG. 1b is a cross-section schematic diagram for the periphery of the polarizer according to the embodiment of the invention. The conductive layer 13 and the protective film layer 12 are bonded by adhesive. Optionally, the adhesive can be a conductive adhesive layer.

In the polarizer provided by the embodiment of the invention, a conductive layer 13 is attached to the periphery of the main body layer 11. In this way, during the film peeling process, the generated static electricity can be diffused through the conductive layer to the grounded periphery. The conductive layer on the periphery can be in contact with the metal on the surface of the liquid crystal panel, the metal can be connected to the ground by the module. Therefore, the charge will be dissipated and conducted to the ground. The unrecoverable mura caused by the accumulated static electricity during the film peeling process is avoided, thereby reducing the probability of bad quality products.

Embodiment 2

In the polarizer provided by the embodiment of the invention, with the structure design, the charge conduction performance is improved and the electrostatic discharge paths are increased. Optionally, in an implementation, the protective film layer 12 is attached to the main body layer 11 through a pressure-sensitive adhesive layer. In order to further improve the conductivity of charge, the pressure-sensitive adhesive layer of the protective film 12 can be a processed adhesive layer with a good conductive diffusion property. Optionally, the conductive diffusion parameter of the pressure-sensitive adhesive layer is greater than a preset threshold. For example, but not limited to, the pressure-sensitive adhesive layer is composed of a conductive polymer material, an electric network, a carbon black doped material or a conductive particle doped material.

Embodiment 3

In order to further improve the conductivity of charge, a metal film is formed between the main body layer 11 and the protective layer 12 by evaporation. In an implementation, a general metal film can be applied. A metal film has good conductivity, and can produce polarized light with a grid structure. The grid structure of the metal film is a strip light leakage structure, which is same to a grating structure with grating slits on the order of mm (millimeter). In an implementation, considering the difficulty of processing, optionally, the metal film can be a copper film or aluminum film. Preferably, the polarization direction generated by the grid of the metal film is in accordance with the polarization direction of the main body layer 11.

In an implementation, the thickness of the conductive layer 13 is same or close to the thickness of the main body layer 11 and has good electrical conductivity. Optionally, the viscosity on the surface of the conductive layer 13 attached to the protective film layer 12 is relatively strong, and the viscosity on the surface of the conductive layer 13 attached to the release film 14 is relatively weak. The conductive layer 13 can be a carbon black adhesive layer or an aluminum film, and the thickness of the conductive layer 13 can be equal to the thickness of the main body layer 11. Optionally, the thickness of the conductive layer can be between 50-200 um.

Figure 2:
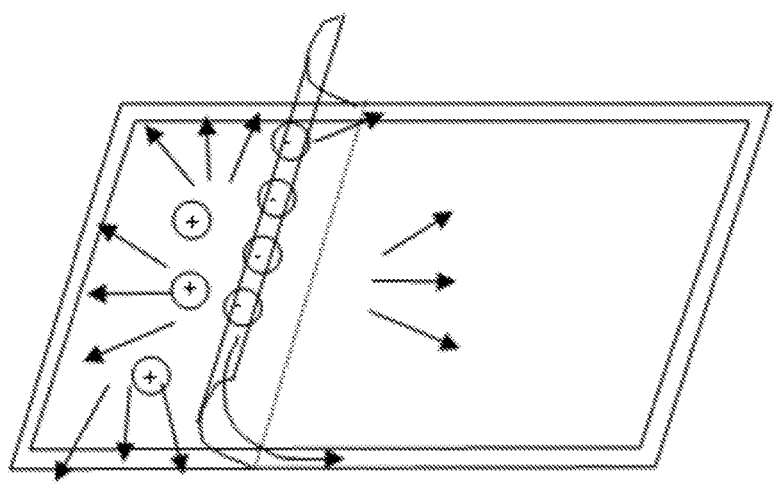
FIG. 2 is a schematic diagram showing electrostatic discharge paths during a film peeling process according to an embodiment of the invention.

FIG. 2 is a schematic diagram showing electrostatic discharge paths during a film peeling process according to an embodiment of the invention.

In the embodiment of the invention, the conductive property of the polarizer is enhanced, and the conductive layer is added on the periphery of the polarizer. In this way, during the film peeling process, the generated static electricity can be diffused to the grounded periphery through the conductive layer and the surface of the polarizer. The conductive layer on the periphery can be in contact with the metal on the surface of the panel, the metal can be connected to the ground by the module. Therefore, the charge will be dissipated and conducted to the ground. The basic principle lies in that the charge conduction performance can be improved and the electrostatic discharge paths can be increased with the structure design.

Embodiment 4

Figure 3A:
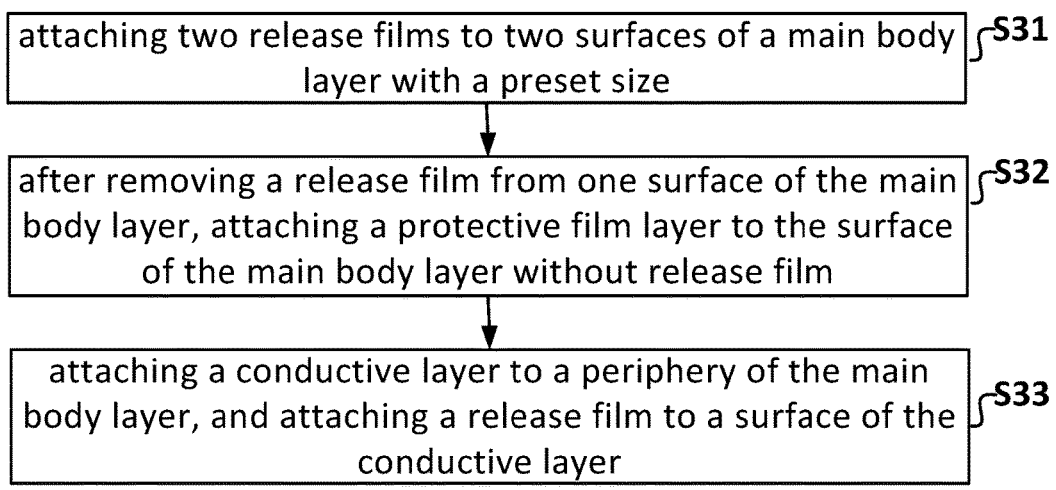
FIG. 3a is a flow chart of a method for manufacturing a polarizer according to an embodiment of the invention.

FIG. 3a is a flow chart of a method for manufacturing a polarizer according to the embodiment of the invention. The method can include the following steps.

S31, attaching two release films to two surfaces of a main body layer with a preset size.

S32, after removing a release film from one surface of the main body layer, attaching a protective film layer 12 to the surface of the main body layer without release film.

S33, attaching a conductive layer 13 to a periphery of the main body layer, and attaching a release film to a surface of the conductive layer 13 departing from the remaining release film.

Optionally, the release film attached on the other surface of the main body layer covers the main body layer and extends to the periphery of the main body layer.

Figure 3B:
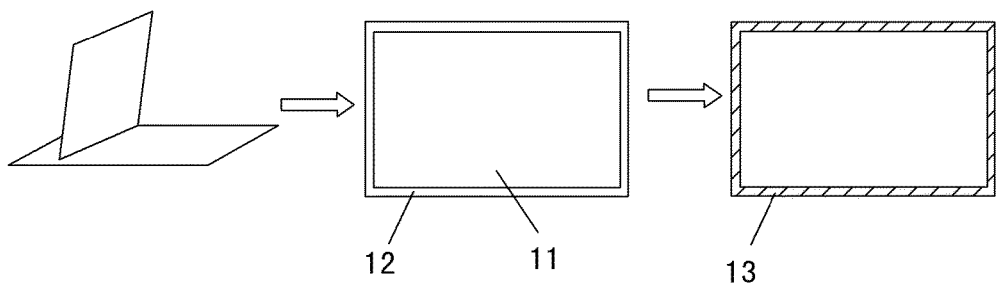
FIG. 3b is a schematic diagram for attaching a conductive layer according to an embodiment of the invention.

FIG. 3b is a schematic diagram for attaching the protective film layer 12 and the conductive layer 13 according to an embodiment of the invention.

Based on the same inventive concept, an embodiment of the present invention also provides a display panel. The principle of the display panel for solving the problem is similar to that of the above mentioned polarizer. Therefore, the implementation of the display panel can refer to the embodiments of the above mentioned polarizer, which will not be repeated herein.

Embodiment 5

Figure 4A:
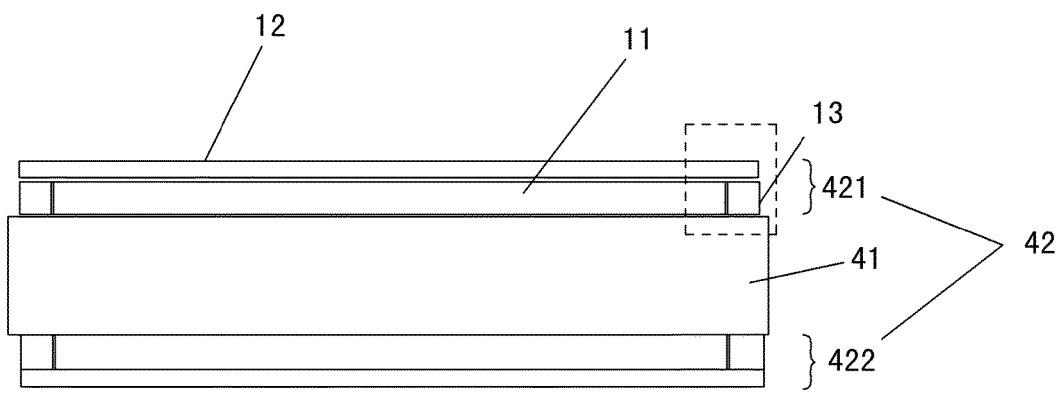
FIG. 4a is a structural schematic diagram of a display panel according to an embodiment of the invention.
Figure 4B:
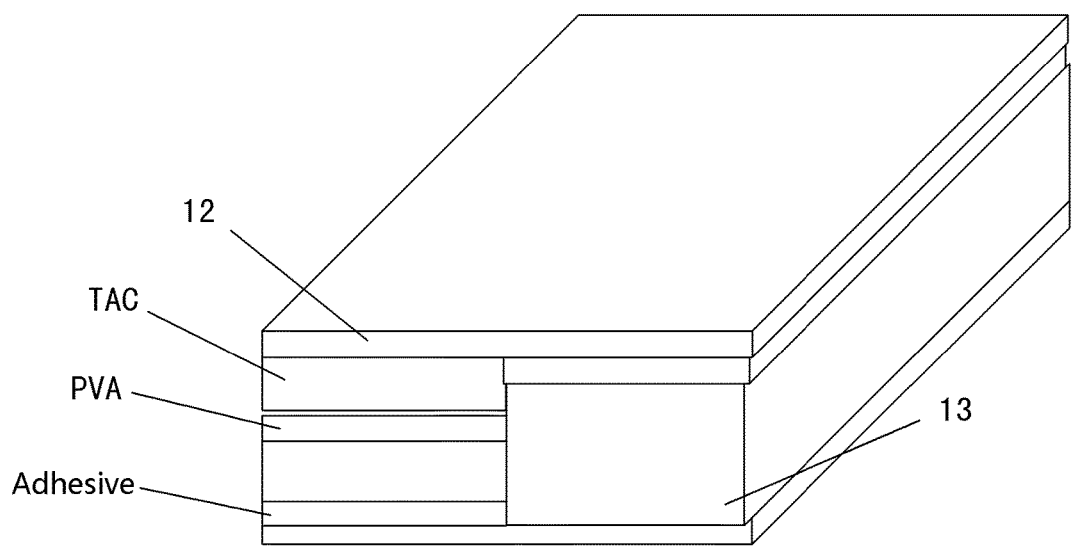
FIG. 4b is a cross-section schematic diagram showing an attaching portion of a liquid crystal panel and the polarizer according to an embodiment of the invention.

FIG. 4a is a structural schematic diagram of a display panel according to the embodiment of the invention. The display panel includes a liquid crystal panel 41 and two above mentioned polarizers 42, from which the release films are removed. The first polarizer 421 is attached to a first surface of the liquid crystal panel 41 through a second surface of the first polarizer 421, and the second polarizer 422 is attached to a second surface of the liquid crystal panel 41 through a second surface of the second polarizer 422. FIG. 4b is a cross-section schematic diagram showing the attaching portion of the liquid crystal panel 41 and the polarizer 42, the attaching portion corresponds to the dotted box in FIG. 4a. In FIG. 4b, TAC is three cellulose acetate, and PVA is polyvinyl alcohol. The PVA film is sandwiched between two layers of TAC. The PVA film and two layers of TAC constitute the main body layer. TAC is applied to ensure the extension and mechanical strength of the stretched PVA.

Based on the same inventive concept, an embodiment of the present invention also provides a display device including the above mentioned display panel. The principle of the display device for solving the problem is similar to that of the above mentioned polarizer. Therefore, the implementation of the display device can refer to the embodiments of the above mentioned polarizer, which will not be repeated herein.

The above embodiments are only used for explanations rather than limitations to the present invention, the ordinary skilled person in the related technical field, in the case of not departing from the spirit and scope of the present invention, may also make various modifications and variations, therefore, all the equivalent solutions also belong to the scope of the present invention, the patent protection scope of the present invention should be defined by the claims.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A polarizer comprising a main body layer, a protective film layer, a conductive layer and a release film;
    wherein a lateral surface of the main body layer is attached with the conductive layer; the conductive layer has a thickness substantially equal to a thickness of the main body layer;
    wherein the protective film layer is attached to both a first surface of the main body layer and a top surface of the conductive layer;
    and wherein the release film is attached to both a second surface of the main body layer located opposite to the first surface of the main body layer and a bottom surface of the conductive layer located opposite to the top surface of the conductive layer; and the second surface of the main body layer and the bottom surface of the conductive layer are located in a same plane.

2. The polarizer according to claim 1, wherein the first surface of the main body layer is evaporated with a metal film; a polarization direction generated by a grid of the metal film is consistent with a polarization direction of the main body layer.

3. The polarizer according to claim 2, wherein the metal film is an aluminum film or a copper film.

4. The polarizer according to claim 1, wherein the protective film layer is attached to the first surface of the main body layer through a pressure-sensitive adhesive layer.

5. The polarizer according to claim 4, wherein a conductive parameter of the pressure-sensitive adhesive layer is greater than a preset threshold.

6. The polarizer according to claim 5, wherein the pressure-sensitive adhesive layer is composed of a conductive polymer material, an electric network, a carbon black doped material or a conductive particle doped material.

7. The polarizer according to claim 1, wherein a conductive adhesive layer is applied for bonding the release film and the conductive layer.

8. The polarizer according to claim 1, wherein the conductive layer is a carbon black adhesive layer or an aluminum film.

9. A method for manufacturing the polarizer according to claim 1, comprising:
- attaching a conductive layer to a lateral surface of a main body layer; the conductive layer having a thickness substantially same to a thickness of the main body layer;
- attaching a protective film layer to a first surface of a main body layer and a top surface of the conductive layer; and
- attaching a release film to a second surface of the main body layer located opposite to the first surface of the main body layer and a bottom surface of the conductive layer located opposite to the top surface of the conductive layer and the second surface of the main body layer and the bottom surface of the conductive layer being located in a same plane.

10. The method according to claim 9, wherein attaching a release film to a second surface of the main body layer comprises: applying a conductive adhesive layer for bonding the release film and the conductive layer.

11. A display panel comprising a liquid crystal panel and two polarizers according to claim 1 from which the release films are removed;
- wherein a first polarizer is attached to a first surface of the liquid crystal panel through a second surface of the first polarizer;
- and wherein a second polarizer is attached to a second surface of the liquid crystal panel through a second surface of the second polarizer.

12. A display device comprising the display panel according to claim 11.

13. The display panel according to claim 11, wherein the first surface of the main body layer is evaporated with a metal film; a polarization direction generated by a grid of the metal film is consistent with a polarization direction of the main body layer.

14. The display panel according to claim 13, wherein the metal film is an aluminum film or a copper film.

15. The display panel according to claim 11, wherein the protective film layer is attached to the first surface of the main body layer through a pressure-sensitive adhesive layer.

16. The display panel according to claim 15, wherein a conductive parameter of the pressure-sensitive adhesive layer is greater than a preset threshold.

17. The display panel according to claim 16, wherein the pressure-sensitive adhesive layer is composed of a conductive polymer material, an electric network, a carbon black doped material or a conductive particle doped material.

18. The display panel according to claim 11, wherein a size of the protective film layer is larger than a size of the main body layer;
- and wherein a conductive adhesive layer is applied for bonding the protective film layer and the conductive layer.

19. The display panel according to claim 11, wherein the conductive layer is a carbon black adhesive layer or an aluminum film.

* * * * *